June 23, 1936.   H. H. YERK ET AL   2,044,826
SLICING MACHINE
Filed May 12, 1932    4 Sheets-Sheet 1

INVENTOR
H. H. Yerk & W. C. Palmer
BY
Evans & McCoy
ATTORNEYS

June 23, 1936.　　H. H. YERK ET AL　　2,044,826
SLICING MACHINE
Filed May 12, 1932　　4 Sheets-Sheet 2

INVENTOR
H. H. Yerk & W. C. Palmer
BY
Evans & McCoy
ATTORNEYS

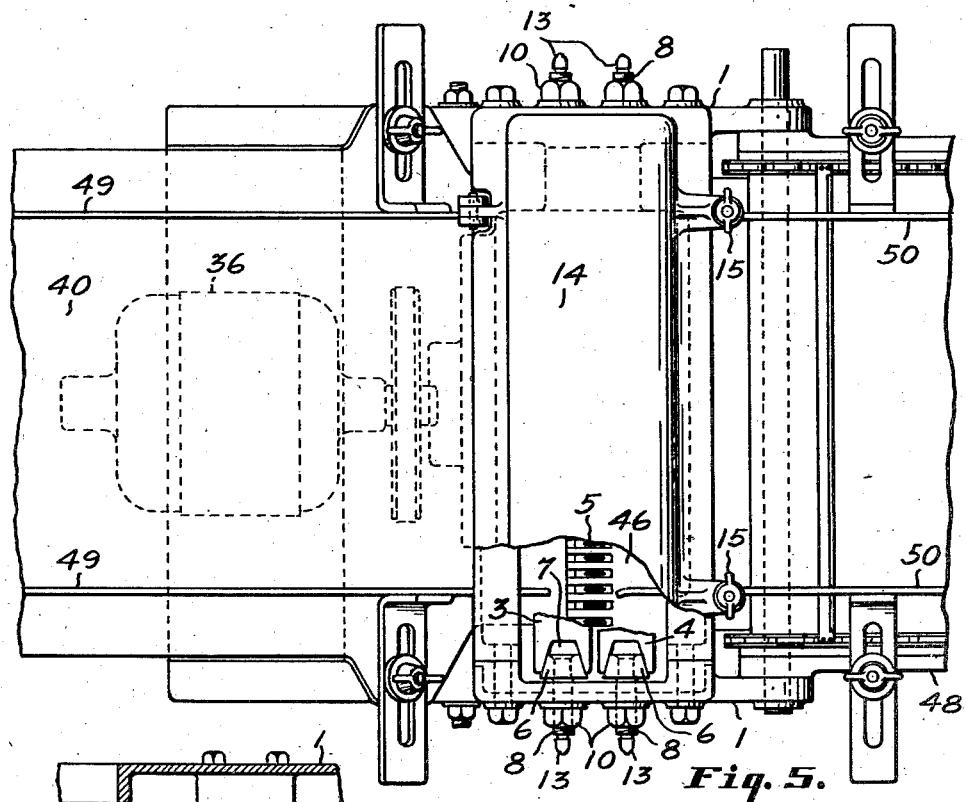
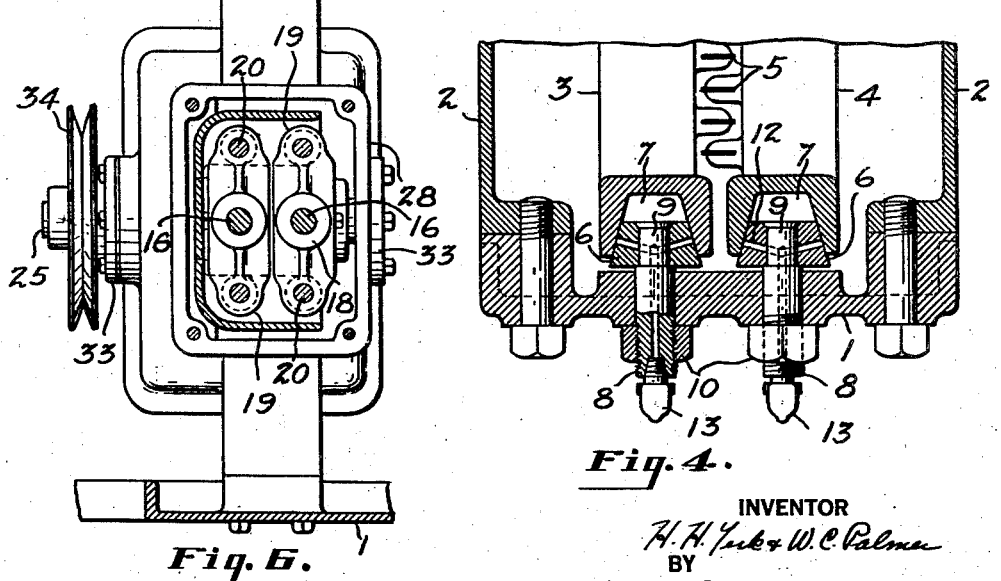

Patented June 23, 1936

2,044,826

UNITED STATES PATENT OFFICE 2,044,826

SLICING MACHINE

Henry H. Yerk and William C. Palmer, Davenport, Iowa, assignors, by mesne assignments, to The Micro Corporation, Bettendorf, Iowa, a corporation of Delaware Application May 12, 1932, Serial No. 610,884

7 Claims. (Cl. 146—153)

This invention relates to slicing machines, and more particularly to machines for use in the commercial production of sliced bread.

One of the objects of the present invention is to provide a bread slicing machine of simplified construction which can be economically manufactured and which can be efficiently and economically operated.

Another object is to provide a bread slicing machine for commercially slicing baked bread which is operated through the medium of a relatively small number of working parts.

Another object is to provide a bread slicing machine in which all working parts, with the exception of the cutter blades, are completely enclosed.

A further object is to provide a bread slicing machine of simplified construction having a pair of oppositely reciprocable blade frames with simplified means for reciprocating the same and for guiding them during their reciprocation.

With the above and other objects in view which will be apparent from the following detailed description, the same consists in certain features of construction and combinations of parts which will be readily understood by those skilled in the art to which the invention appertains.

In the drawings which illustrate a suitable embodiment of the invention,

Fig. 4 is an enlarged section taken substantially on the line 4—4 of Fig. 1 showing the means for guiding and lubricating the blade frame;

Fig. 5 is a plan view of the apparatus shown in Fig. 1, portions of the same being broken away and shown in section;

Fig. 6 is an enlarged section taken on line 6—6 of Fig. 1;

Referring to the accompanying drawings in which like numerals refer to like parts throughout the several views, the slicing machine of the present invention, including the feeding and delivery means, is supported by a pair of side frames 1 which are interconnected at their upper ends by a pair of spaced cross members 2 rigidly secured thereto, and at their lower portions by a housing structure to be later described and which encloses the operating means for the cutting mechanism.

Figure 1:
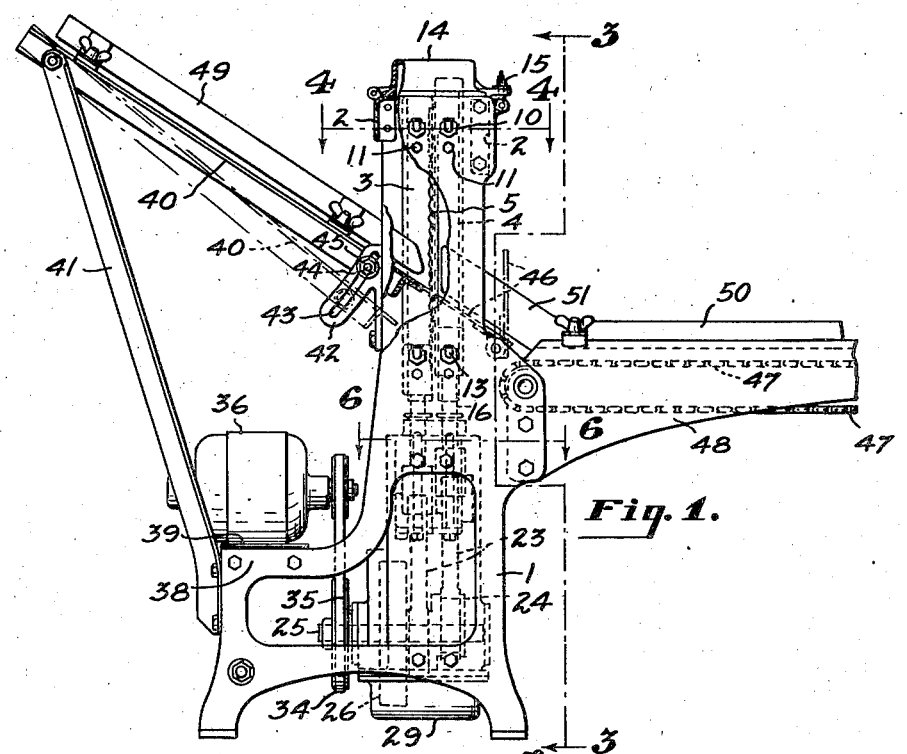
Figure 1 is a side elevation of the bread slicing machine, a portion of the side frame being broken away to show the cutter blades and the means for feeding the bread to the same.
Figure 3:
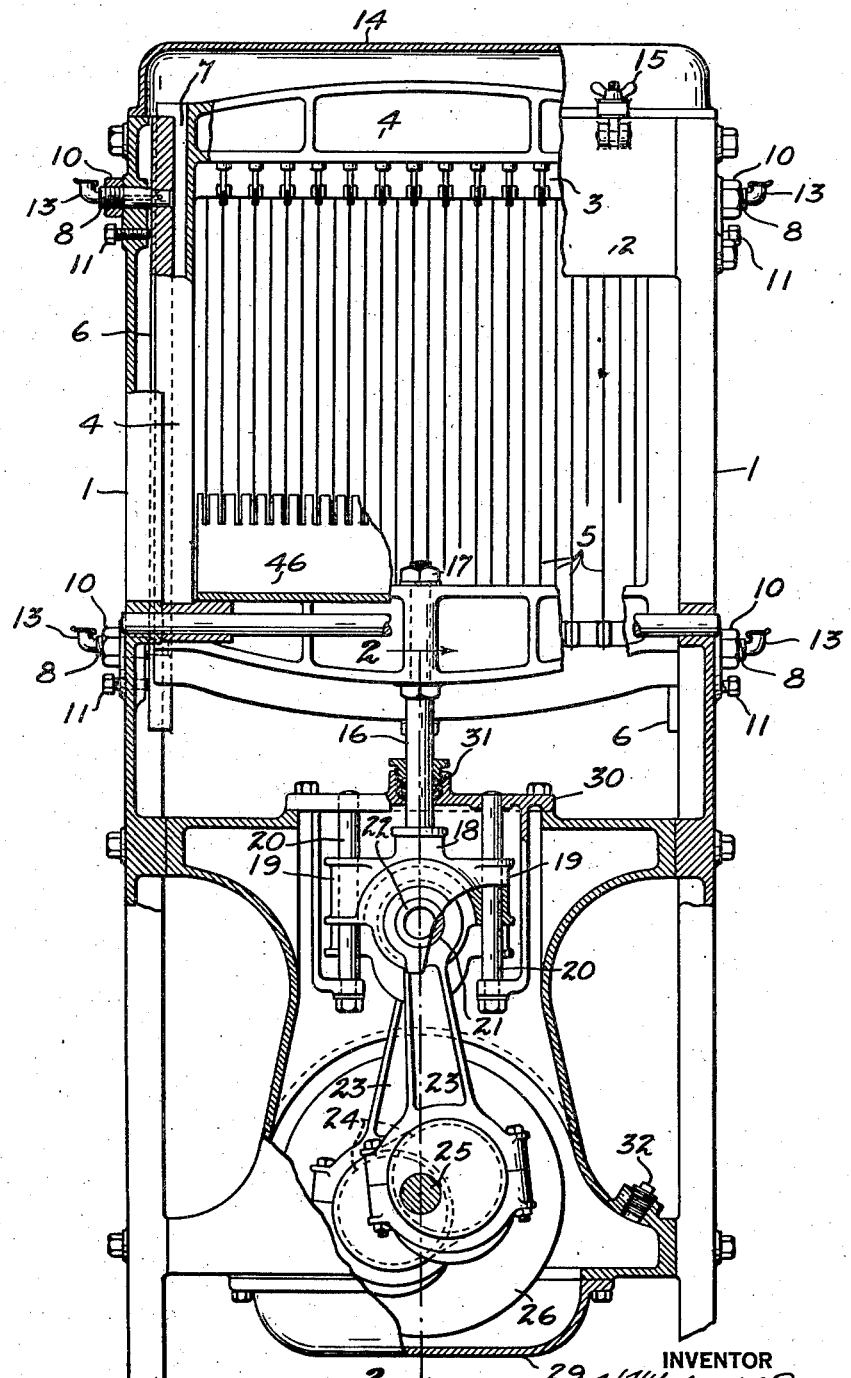
Fig. 3 is a partial section taken approximately on the line 3—3 of Fig. 1, portions of the same being broken away and shown in section.

The slicing mechanism comprises a pair of oppositely reciprocable blade frames 3 and 4 which carry the cutter blades 5 and the means for operating the same. These blade frames, although here shown as being of single piece construction, may be constructed in any desired manner. Each blade frame carries the regularly spaced cutter blades 5 and are mounted on the side frames 1 in such a manner that the blades 5 of the one frame are disposed intermediate the blades of the other frame and with the cutting edges of all blades of both blade frames in substantial alignment, as shown in Figs. 1 and 4, so that when the bread to be sliced is fed thereto the cutting edges of all the blades will engage the bread at substantially the same time. These blade frames 3 and 4 are mounted to reciprocate in a vertical direction and opposite to each other, and the mounting means, as shown in Figs. 3 and 4, comprises a pair of opposed guides 6 carried by the side frames 1 for each blade frame. The sides of each guide 6 converge toward each other and inwardly toward the center of the machine to fit within a V-shaped groove 7 formed in the adjacent side of the side frame.

Referring to Figs. 3 and 4, each guide 6 is carried by a pair of spaced pins 8 having a reduced portion 9 extending through the guide and riveted over the guide at the opposite end to rigidly secure the pin to the guide. These pins 8 slidably extend through the side frame and are threaded at their outer ends to receive adjusting nuts 10 which may be tightened or loosened in order to permit the proper location of the blade frame. These pins function in cooperation with set screws 11 adjacent the pins and which are threaded into the side frames to engage with the outer faces of the guides 6. The adjustment of the guide 6 is obtained by threading the set screws 11 inwardly or outwardly, as the case may be, and accordingly loosening or tightening the nuts 10 to permit the movement of the guide in accordance with the movement of the set screws 11.

As previously described, these guides are arranged at opposite sides of each blade frame so that by correspondingly adjusting the guides 6 the frame may be properly centered with respect to the side frames 1 and the operating mechanism, and furthermore so that the proper friction may be set up between the guides 6 and the walls of the guide grooves 7.

The pins 8 are also hollow and are provided with small openings at their inner ends which branch out and communicate with passageways 12 formed in the guides for the purpose of conducting lubricant to the contacting surfaces between the guides and the guide grooves 7.

Suitable oil cups 13 are threaded into the pins 8 to permit the supply of lubricant through the pins to the contacting surfaces mentioned.

The guides 6 and the blade frames slidably mounted thereon are arranged between the planes of the upper frame cross members 2 in such manner that the upper head portions of the frames are concealed by the cross members 2. Furthermore, it is desirable to close in the space above the cross members 2 by means of a cover 14 hinged to one of the cross members 2 and arranged to be clamped by means, such as a wing nut 15, to the other cross member, as shown in Figs. 1 and 3.

The blade frames 3 and 4 are reciprocated in opposite directions by means of vertically movable plungers 16. Each plunger is secured to the lower cross piece of a blade frame by means of suitable nuts 17 and the lower end thereof is provided with a head portion 18 having outwardly extending arms 19 that are cored out parallel to the plunger 16 to form guide surfaces. The head portion is mounted on a pair of rigidly fixed spaced pins 20 which extend through the arms 19 and cooperate with the guide surfaces to positively guide the plunger 16 and attached blade frame for reciprocation in a vertical direction. The head portion 18 is bifurcated immediately below the plunger 16 and provided with aligned journal openings 21 to receive a wrist pin 22 upon which one end of a connecting rod 23, lying between the bifurcations of the head portion, is pivotally mounted, as shown in Fig. 2.

The lower ends of the connecting rods 23 are mounted in any suitable manner upon eccentrics 24 arranged at substantially 180° to each other on a drive shaft 25 which carries a suitable fly wheel 26. The shaft 25 is journaled at its ends on anti-friction bearings 27, here shown as roller bearings, which are carried by opposite sides of housing members 28. These housing members are so shaped as to form a housing for the eccentrics, connecting rods and head portions 18 of the plunger 16, and are rigidly secured to the side frames 1 to provide the cross members for the lower portions of the side frames. These housing portions 28 are open at their upper and lower ends, the lower end being provided with a crank case closure 29 which is removably secured thereto, and the upper end being provided with a closure plate 30 having spaced portions which carry the guide pins 20 upon which the head portions 18 of the connecting rods are mounted.

This plate 30 also carries a packing nut and gland 31 surrounding each of the plungers 16 to guide the same and to prevent the discharge of lubricant from the space within the housing members 28. One of the housing members is provided with a closure plug 32 which is removable so that lubricant can be introduced into the crank case. A certain level of lubricant is maintained within the housing members 28 and crank case so that during operation the lubricant will be splashed upwardly to lubricate the eccentrics and the guide pins 20 for the head portions 18, as well as the wrist pins 22.

Figure 2:
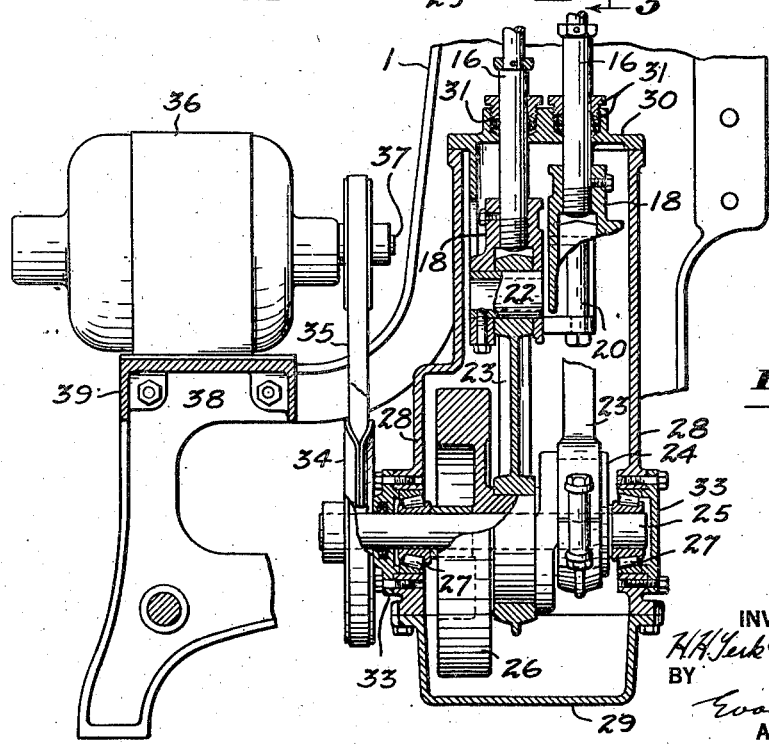
Fig. 2 is an enlarged section taken through the center of the machine approximately on the line 2—2 of Fig. 3.

The anti-friction bearings 27 for the shaft are mounted within relatively large openings formed in the housing portions 28 and are held in place by closure plates 33 rigidly secured to the housing portions 28, as shown in Fig. 2, which permits of easy removal thereof.

The shaft 25 extends through an opening in one of the closure plates 33 and is provided with a suitable drive pulley 34 on its extending portion which is driven by a belt 35 directly from a suitable electric motor 36, the shaft 37 of the motor being arranged parallel with and directly over the shaft 25 which drives the connecting rods 23.

As shown in the drawings, the fly wheel 26 is cast integrally with the eccentric portions or crank arms 24, providing a fly wheel and crank assembly which can be easily assembled with the shaft 25 which extends through the fly wheel and crank assembly just described.

As shown in Fig. 1, the side frames are provided with shelf portions 38 to which a supporting plate 39 for the motor 36 is secured.

The bread to be sliced is preferably fed by gravity to the cutter blades 5 by means of a feed table 40 which inclines upwardly and away from the cutter blades. This feed table is pivoted, as shown in Fig. 1, at its rearward end to upwardly extending brackets 41 which are rigidly secured to the side frames and is mounted at its forward end adjacent the cutter blades on brackets 42 secured to the side frames. The brackets 42 are provided with arcuate slots 43 which receive bolts 44 secured to the feed table 40 and which carry nuts 45 that can be tightened down against the brackets 44 to rigidly clamp the feed table in the desired position. The bread is supported on its movement through the cutter blades on a plate 46 arranged to be pivoted to the forward portions of the side frames, as shown in Fig. 1, and which is provided with finger portions extending between the cutter blades and seating on the forward edge of the feed table 40.

The sliced bread discharged from the inclined plate 46 moves directly onto an endless conveyor 47 which is carried by forwardly projecting portions 48 of the side frames 1 which, if desired, may lead directly to a suitable wrapping machine (not shown).

The bread is guided during its passage down the feed table 40 by means of suitable side plates 49 adjustably secured to the feed table 40 and is also guided as it is being delivered away from the cutter blades by means of spaced side plates 50 adjustably carried by the delivery end of the mechanism. The side guides 50 are also formed with rearwardly extending inclined portions 51 spaced above the plate 46 and terminating adjacent the non-cutting edges of the cutter blades so that, while the bread is being sliced, it is guided by the guides 49 as well as by the guides 50 at the delivery side thereof.

The slicing machine described is so constructed that the blade frames 3 and 4 may be easily removed for replacement by blade frames having cutters arranged with a different spacing therebetween, or replaced by blade frames having sharpened blades therein. This is easily accomplished by pivoting the cover plate 14 back to the desired position, as shown in broken outline, pivoting the feed table 40 downwardly to the position shown in broken outline in Fig. 1, and also pivoting the transfer plate 46 upwardly to the position shown in broken outline in Fig. 1. The nut 17 mounting the blade frame upon its plunger 16 is removed and the blade frame can then be easily removed by bodily withdrawing the same upwardly between the cross members 2 of the framework.

One of the features of the present invention is the ease with which the machine can be assembled and dis-assembled. After the blade frames are removed the operating mechanism can be easily dismantled by removing the cover plate 30 and crank case 29, and then by unbolting the housing portions 28 from the side frames 1.

As previously explained, the blade frames 3 and 4 can be easily adjusted to a centered position by merely adjusting the side guides 6 therefor.

Since the shaft 25 is mounted upon anti-friction bearings, and the plungers for the blade frames are reciprocated by means of eccentrics, the slicing mechanism is subjected to very little vibration.

Figure 7:
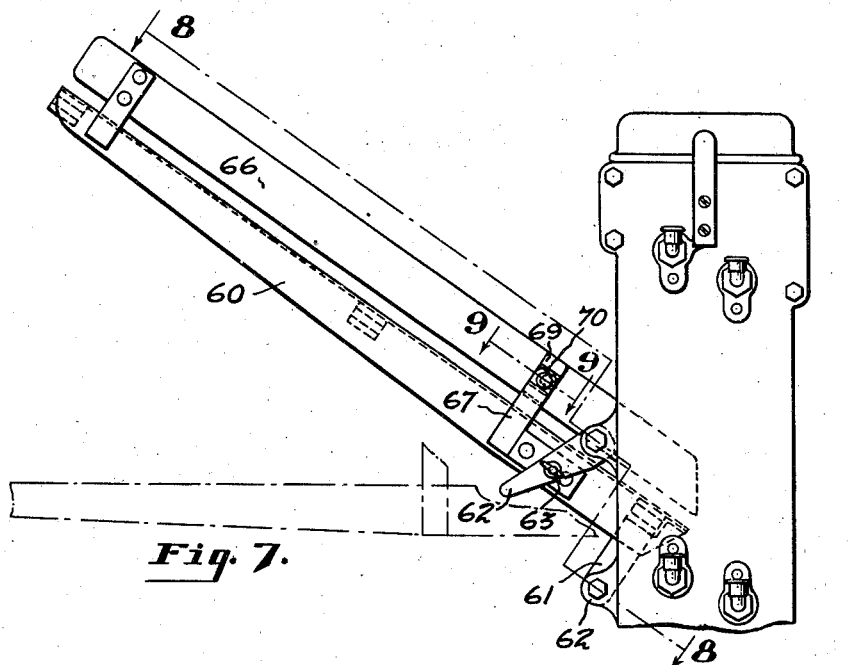
Fig. 7 is a partial side elevation of the upper portion of the slicing machine shown in Fig. 1, showing an improved mounting means for the feed chute.
Figure 8:
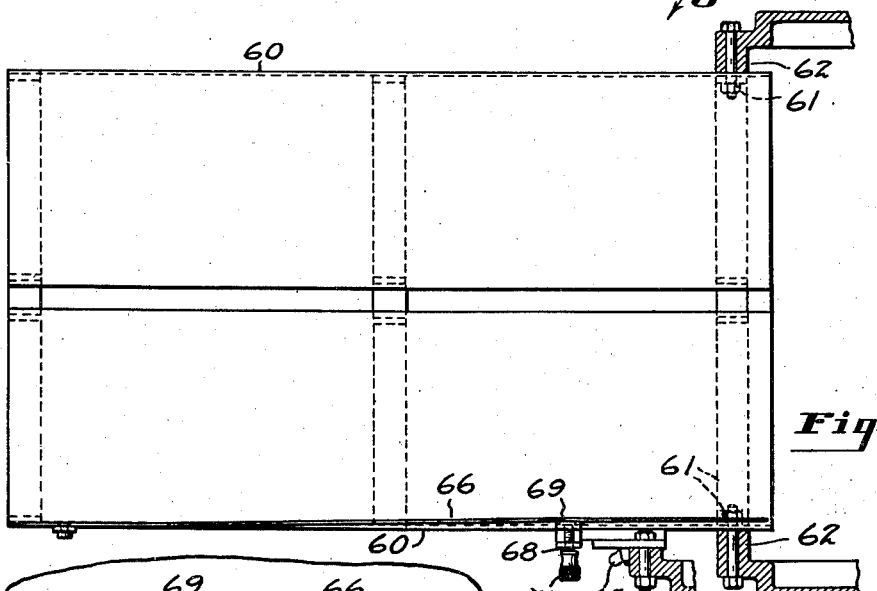
Fig. 8 is a plan view of the feeding chute shown in Fig. 7 showing the adjustable side guide.
Figure 9:
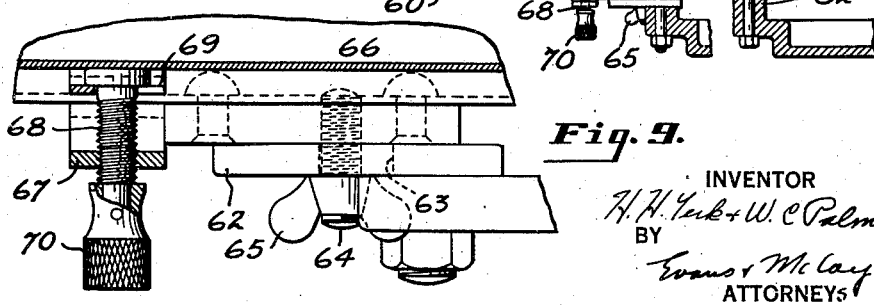
Fig. 9 is a section taken approximately on line 8—8 of Fig. 7.

A modified feeding arrangement is shown in Figs. 7 to 9, in which the feed chute is supported in a manner slightly different than that shown in Fig. 1. In Figs. 7 and 8 the feed table 60 is provided at the end adjacent the slicing mechanism with a pair of depending supports 61, and these supports 61 are pivoted to inwardly extending lugs 62 formed at the inner sides of the upper portions of the side frames. The feed table is supported in its inclined position, as shown in solid outline in Fig. 7, by means of a latch lever 62 pivoted to the side frames above the pivotal connection of the feed table with the side frames. This latch lever 62 is provided with a side opening slot 63 which is arranged to receive a pin 64 carried by the feed table 60, so that when the feed table is in its normal inclined position the latch lever 62 supports the weight of the table and prevents the same from swinging downwardly. The pin 64 is provided with a suitable wing nut 65 which can be threaded onto the pin to clamp the latch lever against the feed table and prevent inadvertent movement of the same out of engagement with the pin 64.

When it is desired to remove the blade frames, it is only necessary in this construction to loosen the wing nut 65 and disengage the lever 62 from the pin 64, which permits the feed table 60 to swing downwardly to a substantially horizontal position, as shown in broken outline in Fig. 7, to thereby bring the inner end of the feed table which lies adjacent the cutter blades out of the path of the blade frames.

In order to compensate for the slicing of loaves of bread of different lengths, and to properly guide the same into the slicing mechanism, one of the side guides 66 is adjustable. This side guide 66 is preferably formed of spring metal and rigidly secured to the feed table at its rearward end. The inner end of the side guide 66 is, as shown in Figs. 7 and 9, supported by a bracket 67 secured to the feed table and is adjustably mounted thereon by means of a screw 68 threaded through the bracket 67 and securely held by the side guide 66. As here shown, the head of the screw 68 abuts against the side guides 66 and is clamped against the same by means of a stamped metal housing 69 which is suitably secured to the side guide in such a manner as to permit rotation of the screw 68. The screw 68 is provided with a knurled portion 60 rigidly secured thereto which, when it is desired to adjust the space between the inner ends of the side guides, can be rotated to cause the screw to thread through the bracket 67.

It is to be understood that in the slicing machine described, the sliced loaves of bread may be fed directly onto the conveying unit 47 which may carry the bread to a wrapping machine or, if desired, the sliced bread may be fed onto a stationary table and then manually removed therefrom and wrapped.

By forming the fly wheel integral with the eccentrics, it is obvious that the same can be very closely associated and will provide a very smooth operating mechanism since these closely associated parts will obviate considerable vibration.

It is to be understood that the eccentrics 24 may be replaced by a conventional crank shaft when it is desired to have a longer stroke of the blade frames, and also that the fly wheel may be mounted either within or without the housing 28. In some instances it may be desired to employ two fly wheels.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What we claim is:

1. In a bread slicing machine, a pair of spaced side frames, a pair of oppositely reciprocable blade frames mounted between said side frames and each carrying a plurality of spaced cutters, each of said blade frames having side pieces provided with longitudinally extending V-shaped grooves therein, guides on said side frames of V-shape in cross-section and fitting within said grooves, pins rigidly secured to said guides and being slidably supported in said side frames for supporting said guides, means for feeding lubricant through said pins to said guides and means for moving said guides relative to said grooves of said side frames.

2. In a bread slicing machine having a slicing mechanism supported by side frames, an inclined feed table for feeding loaves of bread to said slicing mechanism, and means for supporting said table on said side frames comprising brackets secured to the inner end of said feed table and pivoted to said side frames, and a latch lever pivoted to said side frames above the pivotal connection of said side table with said side frames and being engageable with said feed table rearwardly of said pivotal connection to support said feed table from said side frames in an inclined position.

3. In a bread slicing machine having a slicing mechanism supported by side frames, an inclined feed table for feeding loaves of bread to said slicing mechanism, and means for supporting said table on said side frames comprising brackets secured to the inner end of said feed table and pivoted to said side frames, and a latch lever pivoted to said side frames above the pivotal connection of said feed table with said side frames and being engageable with said feed table rearwardly of said pivotal connection to support said feed table from said side frames in an inclined position, said latch lever being releasable from said feed table to permit said feed table to be swung downwardly to inoperative position.

4. In a bread slicing machine having a slicing mechanism supported by side frames, an inclined feed table for feeding loaves of bread to said slicing mechanism, and means for supporting said table on said side frames comprising brackets secured to the inner end of said feed table and pivoted to said side frames, a pin member extending outwardly from said feed table, and a latch lever pivoted to said side frames above the pivotal connection of said feed table with said side frames, said latch lever having a slot therein for receiving said pin whereby said latch lever may support said feed table in an inclined position from said side frames.

5. In a bread slicing machine having a slicing mechanism supported by side frames, an inclined feed table for feeding loaves of bread to said slicing mechanism, and means for supporting said table on said side frames comprising brackets secured to the inner end of said feed table and pivoted to said side frames, a pin member extending outwardly from said feed table, a latch lever pivoted to said side frames above the pivotal connection of said feed table with said side frames, said latch lever having a slot therein for receiving said pin whereby said latch lever may support said feed table in an inclined position from said side frames, and means for securely clamping said latch lever against said feed table to prevent inadvertent disengagement of said lever from said pin.

6. In a bread slicing machine, a pair of spaced side frames, a pair of oppositely reciprocable blade frames mounted between said side frames and each carrying a plurality of spaced cutters, each of said blade frames having side pieces provided with longitudinally extending channels therein, guides carried by said side frames and nesting within said channels and having bearing faces in engagement with the opposite inner faces of said channels, and means for adjustably moving said guides relative to said channels, said guides having passages therein opening through said bearing faces for conducting lubricant thereto, said channels and guides thereby cooperating to guide said blade frames and prevent lubricant from flowing toward said cutters.

7. In a bread slicing machine, a pair of spaced side frames, a pair of oppositely reciprocable blade frames mounted between said side frames and each having a plurality of spaced cutters, a cross member extending between said side frames below said blade frames, said cross member having spaced sides and ends and spaced top and bottom portions, thereby forming an enclosed housing, a shaft within said housing journalled in said sides, a double throw crank carried by said shaft, a pair of guide heads, connecting rods connecting said crank and guide heads, and rod members extending through said top portion and being connected with said guide heads and blade frames, said top portion being removable and provided with guides, and said guide heads being slidably mounted on said guides.

HENRY H. YERK.
WILLIAM C. PALMER.